March 14, 1939. C. J. FITZGERALD ET AL 2,150,368
MEANS FOR LOCKING A PRISONER IN AN AUTOMOBILE
Filed March 9, 1937
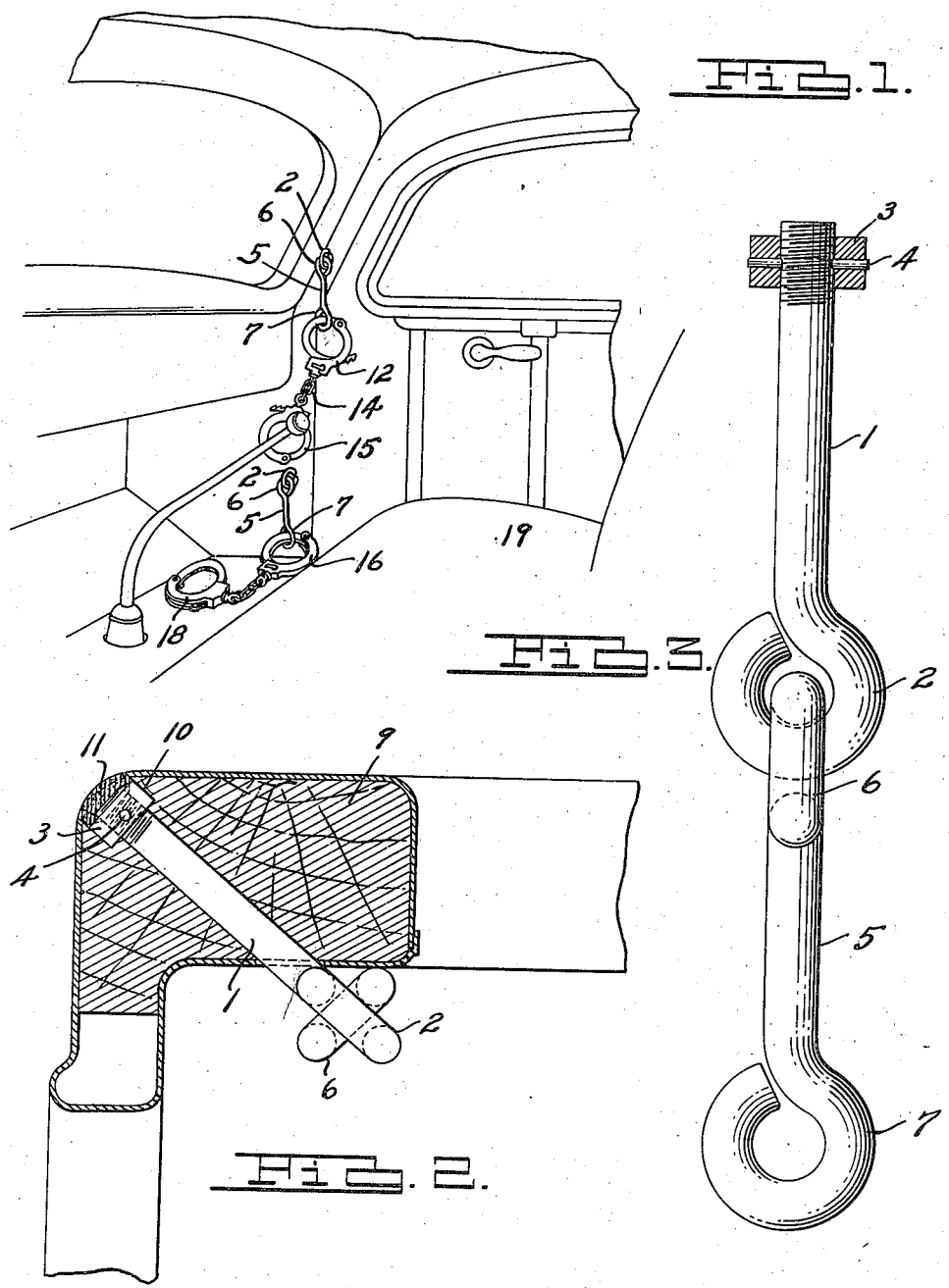
INVENTOR.
Claude J. Fitzgerald
BY Bessie V. Fitzgerald
ATTORNEY.

Patented Mar. 14, 1939

2,150,368

UNITED STATES PATENT OFFICE 2,150,368

MEANS FOR LOCKING A PRISONER IN AN AUTOMOBILE

Claude J. Fitzgerald and Bessie V. Fitzgerald, Wyandotte, Mich.

Application March 9, 1937, Serial No. 129,864

1 Claim. (Cl. 70—16)

This invention relates to a means for locking a prisoner in an automobile and the object of the invention is to provide such means for police cars or sheriffs' cars whereby the prisoner may be locked in the car in such a way as to prevent him from attacking or disturbing the driver of the car and so arranged that the driver of the car may leave the car without danger of the prisoner driving the car away.

Another object of the invention is to provide a support secured firmly to one of the automobile body pillars and so arranged that the prisoner cannot remove the support from the car body nor twist the support out of position in attempting to get away.

A further object of the invention is to provide an arrangement whereby the hands and legs of the prisoner may both be locked and are still movable to a limited extent to allow the prisoner to vary his position and, at the same time, limiting the prisoner in such movement as to prevent him from attacking the car driver.

A further object of the invention is to provide a device of the character described for sheriffs' or police cars in which the prisoner may sit comfortably in the seat and, at the same time, is limited in his movements.

These objects and the several novel features of the invention are hereinafter more fully described and claimed and the preferred form of construction by which these objects are attained is shown in the accompanying drawing in which—

Fig. 1 is an interior view of an automobile equipped with our invention.

Fig. 2 is an enlarged section through the body pillar to which the support is secured.

Fig. 3 is an enlarged plan view of the support and connecting link.

The device itself is shown more particularly in Fig. 3 and comprises an eye bolt 1 having an enlarged eye 2 at one end. A round nut 3 is threaded onto the opposite end of the bolt and the bolt and nut are provided with apertures through which a pin 4 may be driven to lock the nut to the bolt. A link 5 is provided having an eye 6 at one end which extends through the eye 2 of the bolt 1 and this link is also provided with an eye 7 at the opposite end through which one end of a handcuff may be secured.

To install the device, an aperture is drilled through the body pillar 9 and an enlarged recess 10 is drilled into the outer face of the pillar to receive the round nut 3 as shown in Fig. 2. After the eye bolt 1 has been installed, the recess 10 over the end of the bolt and nut is filled with a plastic or putty at 11 to conceal the fastening device. When so installed, the link 5 will hang in the position shown in Fig. 1. One end 12 of a handcuff 14 is locked through the eye 7 of the link 5 while the other end 15 of the handcuff hangs free. This same installation is provided at the lower portion of the pillar post near the car floor for the leg irons. One leg iron 16 is locked through the eye 7 of the lower link and the other end 18 of the leg iron lies free on the floor.

When the prisoner is brought to the car by the sheriff or police, he is already handcuffed and leg irons have also been put on the prisoner. He is then placed on the seat 19 next to the driver and the handcuff 15 is locked about one wrist while the leg iron 18 is locked over one leg, preferably the left leg so that the prisoner cannot kick the driver or reach the car operating pedals.

By this arrangement, the hands and feet are locked so that it is impossible for the prisoner to attack the driver and thus this will allow transportation of the prisoner by a single police officer who will thus be able to drive the car without danger from the prisoner. Should another police officer need the assistance of the driver, the driver can leave the car without danger of the prisoner escaping or driving the car away.

In applying the plastic or putty 11 in the recess 10 over the end of the bolt and nut, the outer face of the plastic or putty is finished to the same appearance as the remainder of the car so that the attachment of the supporting bolt will not show from the outside and cannot be tampered with. When locked in the car, the prisoner is allowed a limited amount of movement so that he may change his position to remain comfortable while riding and with this arrangement it does not require two or three police officers to ride along for protection each time a prisoner is transported. The same arrangement may be used on the body pillars in the rear portion of the car so that one or more prisoners may be locked in the rear seat.

From the foregoing description it becomes evident that the device is very simple and efficient in operation, will not easily get out of order, provides a means of so locking a prisoner in an automobile that he cannot attack the driver or drive the car and provides a device which accomplishes the objects described.

Having thus fully described our invention, its utility and mode of operation, what we claim and desire to secure by Letters Patent of the United States is—

A means for locking a prisoner in an automobile including an anchoring means having an eye, a link member comprising a rod provided with an eye at each end, one eye being fastened through the eye of the anchoring means, a pair of handcuffs, one handcuff being locked through the eye in the free end of the link member, the arrangement being such that the hand-cuffs are held away from the anchoring means by the rod.

CLAUDE J. FITZGERALD.
BESSIE V. FITZGERALD.